United States Patent [19]

Hosoi

[11] Patent Number: 5,083,290
[45] Date of Patent: Jan. 21, 1992

[54] LUNCH BOX TYPE ELECTRONIC APPARATUS

[75] Inventor: Takashi Hosoi, Oume, Japan

[73] Assignee: Kabushiki Kaisha Toshiba, Kawasaki, Japan

[21] Appl. No.: 722,401

[22] Filed: Jun. 20, 1991

Related U.S. Application Data

[63] Continuation of Ser. No. 400,930, Aug. 31, 1989, abandoned.

[30] Foreign Application Priority Data

Aug. 31, 1988 [JP] Japan .......................... 63-113331[U]

[51] Int. Cl.⁵ .............................................. G06F 1/00
[52] U.S. Cl. ..................................................... 364/708
[58] Field of Search ..................................... 339/92 M

[56] References Cited

U.S. PATENT DOCUMENTS

| | | | |
|---|---|---|---|
| 3,848,953 | 11/1974 | Petroshanoff | 361/391 X |
| 4,669,053 | 5/1987 | Krenz | 364/708 |
| 4,798,469 | 1/1989 | Burke | 356/376 |
| 4,832,419 | 5/1989 | Mitchell et al. | 312/7.2 |
| 4,851,812 | 7/1989 | Holmberg | 364/708 |

Primary Examiner—Gary V. Harkcom
Assistant Examiner—Long T. Nguyen
Attorney, Agent, or Firm—Oblon, Spivak, McClelland, Maier & Neustadt

[57] ABSTRACT

A lunch box type electronic apparatus such as a laptop computer or word processor, including a keyboard unit, a display unit and a body electrically connected thereto, in which a supporting device slidably supports the display unit onto the body between a shutup position where the display unit is shut up onto the body and an operative position where the apparatus is operated, while the face to face relation between the rear surface of the display unit and the front surface of the body is kept during the sliding movement of the display unit with respect to the body, and a slant angle varying device for the display unit is arranged in the upper portion of the front surface of the body.

11 Claims, 4 Drawing Sheets

LUNCH BOX TYPE ELECTRONIC APPARATUS

This application is a continuation of application Ser. No. 07/400,930, filed on Aug. 31, 1989, now abandoned.

BACKGROUND OF THE INVENTION

1. Field of the Invention

The present invention relates to a lunch box type electronic apparatus such as a vertical computer and a word processor, and more particularly to an improvement of a mounting structure of a display of a lunch box type electronic apparatus.

2. Description of the Background Art

Portable and handy electronic apparatuses such as laptop computers or word processors having various advantages, e.g., small and lightweight, and requiring no particular place and space, have been quickly and widely spread. Further, much smaller, more lightweight and more space saving portable electronic apparatuses of this kind have been demanded.

In order to reduce the occupation space of the electronic apparatus on a desk or the like, a recently-developed vertical type or lunch box type rather than an initially-developed flat type is more convenient and advantageously used.

In a vertical type apparatus of this kind including, for example, a display of a thin flat plate form using a liquid crystal display (LCD) or the like, the slant angle and height of the display are usually adjustable, and these adjustable ranges give large effects to the operability.

In a conventional vertical type apparatus of this kind, a vertical display is pivotally mounted on a front top end of a body, and is flipped up to adjust its slant angle. In this case, however, the height of the display can not be adjustable. Also, as the slant angle of the display is increased, the lower end thereof projects frontwards away from the body to change and increase the dimension in depth of the apparatus. Hence, a wide occupancy space for the apparatus is required on the desk.

SUMMARY OF THE INVENTION

Accordingly, it is an object of the present invention to provide a lunch box type electronic apparatus, free from the aforementioned inconveniences and defects of the prior art, which is capable of adjusting slant angle and height of a display at the same time and improving the increase of the occupation space, and which has a simple vertical box structure.

It is another object of the present invention to provide a lunch box type electronic apparatus which is capable of shielding magnetic field of a cable for electrically connecting a display to a body.

In accordance with one aspect of the present invention, there is provided a lunch box type electronic apparatus, comprising a keyboard unit including a keyboard for inputting data, a display unit having a first front surface and a first rear surface and including a flat panel display, a body having a second front surface facing to the first rear surface of the display unit and a second rear surface, the body being electrically connected to the keyboard unit and the display unit, and means for slidably supporting the display unit onto the body between a first position where the display unit is shut up onto the body in a shutup position, and a second position where the display is positioned in an operative position, the face to face relation between the first rear surface of the display unit and the second front surface of the body being kept during the sliding movement of the display unit with respect to the body.

In accordance with another aspect of the present invention, there is provided a lunch box type electronic apparatus, comprising a keyboard unit including a keyboard for inputting data, a display unit having a first front surface and a first rear surface and including a flat panel display, a body having a second rear surface, a second front surface facing to the first rear surface of the display unit positioned in a first position where the display unit is shut up onto the body in a shutup position, and a third front surface arranged on the upper end of the second front surface, the third front surface bending towards the second rear surface and facing to the first rear surface of the display unit positioned in a second position where the display unit is positioned in an operative position, the body being electrically connected to the keyboard unit and the display unit, and means for slidably supporting the display unit onto the body between the first and second positions.

In accordance with still another aspect of the present invention, there is provided a lunch box type electronic apparatus, comprising a display unit having a rear surface with a first opening formed thereon, a body having a front surface with a second opening facing to the first opening, the front surface facing to the rear surface of the display unit, a cable for electrically connecting the display unit with the body, the cable passing through the first and second openings, means for slidably supporting the display unit onto the body, the face to face relation between the first rear surface of the display unit and the second front surface of the body being kept during the sliding movement of the display unit with respect to the body, and cover devices for covering the first and second openings to shield magnetic field of the cable.

BRIEF DESCRIPTION OF THE DRAWINGS

The above and other objects, features and advantages of the present invention will more fully appear from the following description of the preferred embodiments with reference to the accompanying drawings, in which.

DESCRIPTION OF THE PREFERRED EMBODIMENTS

Figure 1:
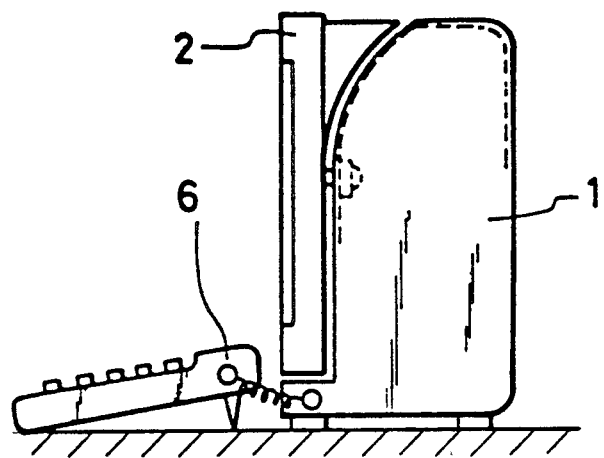
FIG. 1 is a side view of a first embodiment of a lunch box type electronic apparatus having a vertical display on the front side of a body according to the present invention, in which the display is positioned in its shutup position.

Referring now to the drawings, wherein like reference characters designate like or corresponding members throughout the several views, there is shown in FIGS. 1 to 8 a first embodiment of a lunch box type electronic apparatus such as a laptop computer or word processor according to the present invention.

In the drawings, the apparatus comprises a body 1 having an approximately vertical rectangular solid form, a display unit 2 having a thin flat panel display therein, hereinafter referred to as the display 2 in short, located on the front side of the body 1, and a keyboard unit 6 having a keyboard for inputting data to the body 1, hereinafter referred to as the keyboard 6 in short, which is coupled to the body 1 through a signal cable, whose cases are made of a plastic material such as polyacetal or the like. The body 1 is provided with a convex circular arc surface 11 in the upper front surface portion so that the circular arc surface 11 extends around an axis B which extends horizontally in parallel with the front surface of the body 1, as clearly shown in FIG. 2. A pair of guide slot members 12 with a slot therein, projecting outwards with a small height and extending in parallel in the up-and-down direction, is formed in the left and right side end portions of the circular arc surface 11 with a distance $W_1$ between the guide slot members 12. A rectangular window 13 opens in the central upper portion of the circular arc surface 11.

The display 2 is provided with a top cover having an approximately triangular cross section on the upper rear surface, the top cover including a concave circular arc surface 21 in the upper rear surface portion, the circular arc surface 21 conforming to the circular arc surface 11 of the body 1. A pair of guide pins 22 to be inserted into the guide slots of the guide slot members 12 of the body 1, providing with a female thread tapped in the end of each guide pin 22, is formed in the left and right side lower end portions of the circular arc surface 21 to project rearwards in parallel with a distance W which is approximately equal in consideration with a certain clearance between the distance W and W1 of the guide pins 22 and guide slot members 12. A rectangular window 23 opens in the central lower portion of the circular arc surface 21.

Figure 3:
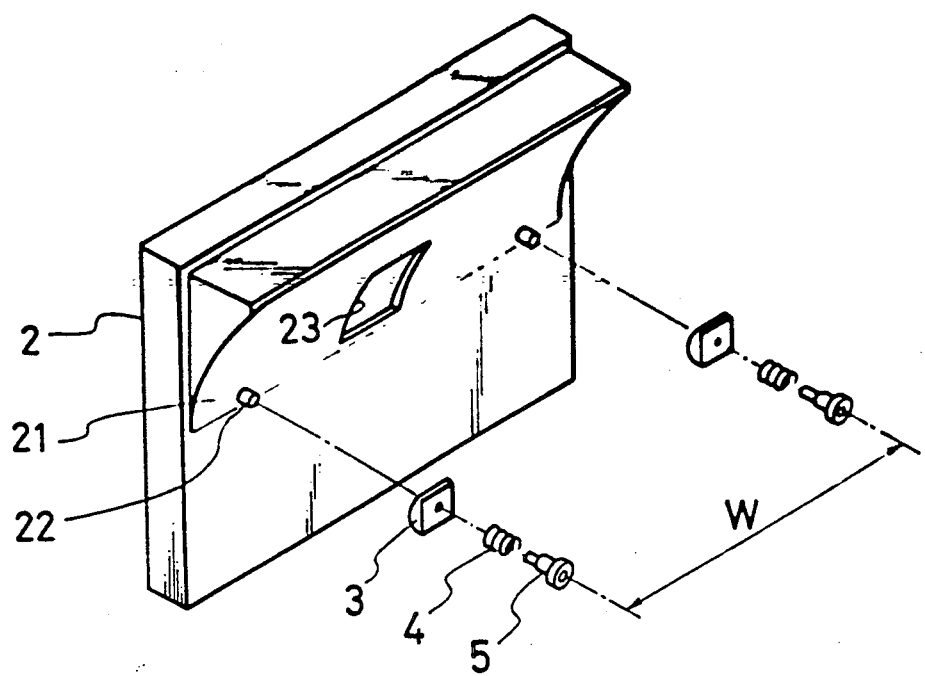
FIG. 3 is an exploded perspective view of the display shown in FIG. 1.
Figure 4:
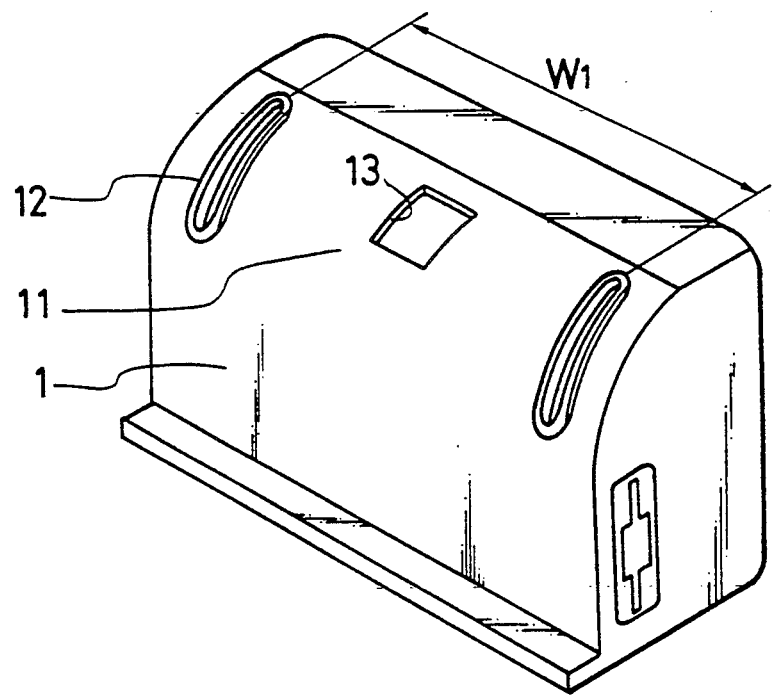
FIG. 4 is a perspective view of the body shown in FIG. 1.
Figure 5:
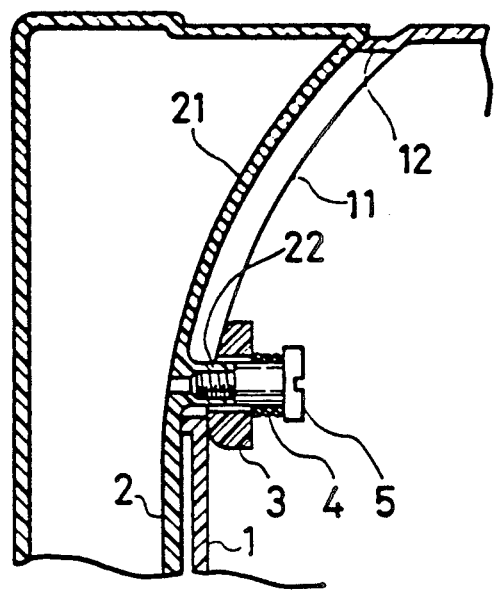
FIG. 5 is a fragmentary longitudinal cross section of a junction portion between the display and body shown in FIGS. 3 and 4.

As shown in FIGS. 3 to 5, the display 2 is slidably mounted to the body 1 by using pairs of friction or slide plates 3, coil springs 4 for adjusting the friction of the slide plates 3 against the body 1 and male screws 5 to be engaged with the female screws of the guide pins 22. That is, after the guide pins 22 of the display 2 are inserted into the slots of the guide slot members 12 of the body 1, the slide plates 3 are fitted on the guide pins 22, and then the screws 5 are engaged with the female screws of the guide pins 22 through the coil springs 4 interposed between the slide plates 3 and the screws 5, while the coil springs 4 bias the slide plates 3 onto the body 1.

Figure 2:
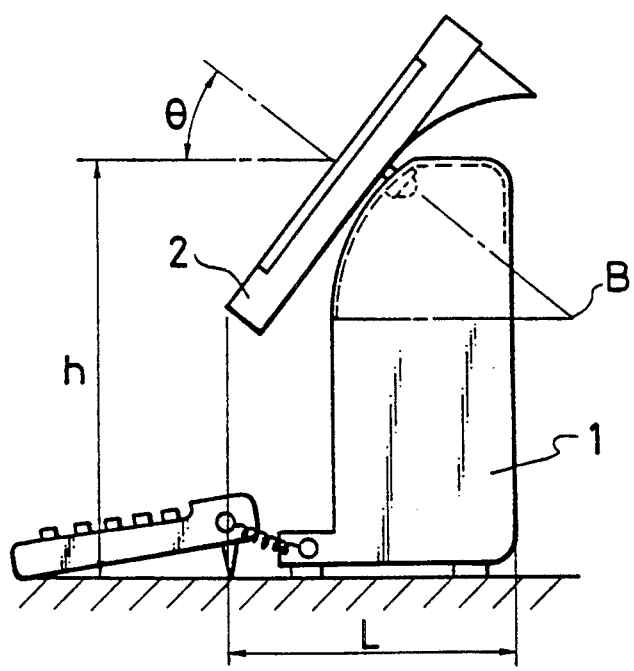
FIG. 2 is a side view, like FIG. 1, of the apparatus shown in FIG. 1, in which the display is positioned in a slant position where the slant angle and height of the display is changed.

When the operation of the electric apparatus is started, the display 2 is slidably moved upwards along the front surface of the body 1 from the shutup position where the display 2 is positioned in approximately the vertical posture, as shown in FIG. 1, to an operative position where the apparatus is operated and the display 2 is slant, as shown in FIG. 2, to change the slant angle $\theta$ and height h of the display 2 at the same time. In this embodiment, when the slant angle of the display 2 is increased, the top end of the display 2 is moved rearwards, and the lower end of the display 2 is somewhat moved frontwards away from the body 1 at the same time.

Hence, the length L in depth of the apparatus is increased not so much, and the increase of the length in depth can be largely reduced, as compared with that of the conventional apparatus, resulting in improving the occupation space of the apparatus. Since the friction of the slide plates 3 against the body 1 can be appropriately adjusted by using the springs 4 and the screws 5 during the moving of the display 2 on the guide slot members 12, the display 2 is stopped and readily fixed at the desired position of the guide slot members 12 to set the desired slant angle and height of the display 2. Although the two guide slot members 12 and the two guide pins 22 are provided in this embodiment, more than two number of these members 12 and 22 may be provided.

Figure 6:
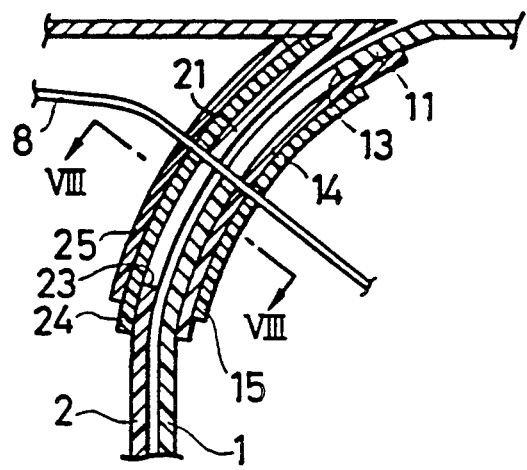
FIGS. 6 and 7 are fragmentary cross sections schematically showing a cord connection portion between the display and body shown in FIGS. 3 and 4.
Figure 7:
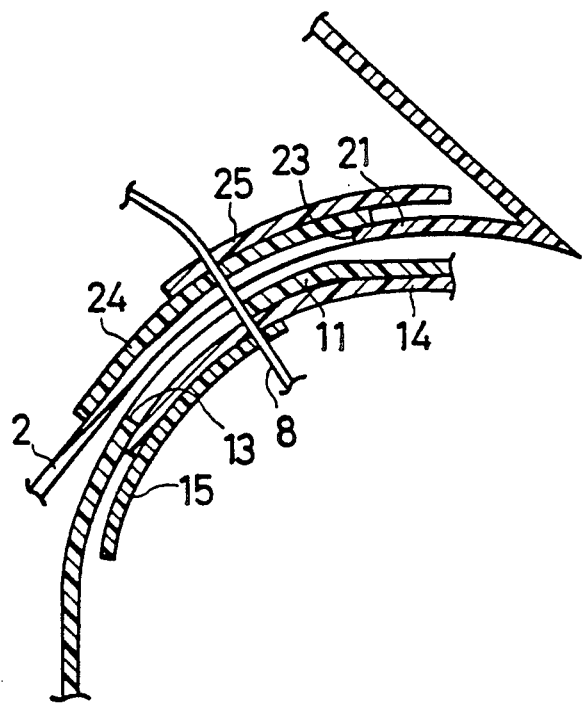
Figure 8:
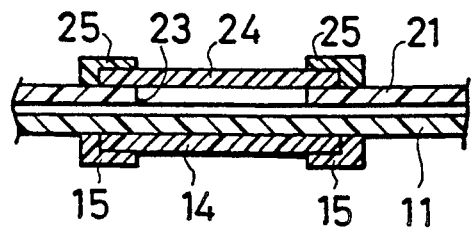
FIG. 8 is a cross sectional view, taken along the line VIII—VIII in FIG. 6.

FIGS. 6 and 7 are vertical cross sections of the rectangular windows 13 and 23 of the respective body 1 and display 2 and a flat signal cable 8 for connecting the body 1 and display 2, passing through the windows 13 and 23 when the display 2 is slidably mounted to the front side of the body 1 in the lowermost or shutup position and uppermost position, as shown in FIGS. 1 and 2, respectively.

That is, when the display 1 is positioned in the lowermost position, the lower end of the window 13 of the body 1 and the upper end of the window 23 of the display 2 overlap each other, as shown in FIG. 6, and, in turn, when the display 1 is positioned in the uppermost position, the upper end of the window 13 and the lower end of the window 23 overlap each other, as shown in FIG. 7. The windows 13 and 23 are covered by flexible shield cover sheets 14 and 24, respectively, at their insides for shielding the magnetic field of the signal cable 8 and also preventing dust, dirt, water or the like from coming into the insides of the body 1 and display 2, and the flexible cover sheets 14 and 24 are movably supported by guide rails 15 and 25 mounted to the inner surfaces of the respective body 1 and display 2, as clearly shown in FIG. 8. The signal cable 8 passes through the central portions of the two windows 13 and 23.

In this embodiment, the display 2 can be electrically connected to the body 1 through the signal cable 8 which is provided at the shortest possible distance without appearing outside of the apparatus. Hence, the signal cable 8 does not become a hindrance or nuisance especially during carrying the apparatus. Further, since the signal cable 8 is connected between the body 1 and display 2 as short as possible within the apparatus, the cable 8 can not be easily damaged, and connectors to be required in the case where the cable is provided outside the apparatus, can be omitted. Furthermore, it is possible to prevent or reduce a phenomenon that a cable is apt to act as an antenna for emitting electromagnetic waves, in particular, when the cable is long.

Figure 9:
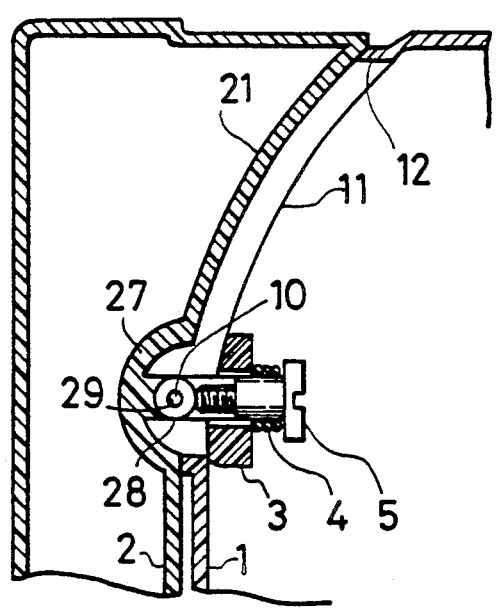
FIG. 9 is a fragmentary longitudinal cross section of a junction portion between a display and a body of a second embodiment of a lunch box type electronic apparatus according to the present invention.

In FIG. 9, there is shown a second embodiment of a lunch box type electronic apparatus according to the present invention, having a similar structure to that of the first embodiment shown in FIGS. 1 to 8. In this embodiment, instead of the guide pins 22 of the first embodiment, the display 2 is provided with a pair of concave portions 27 on the circular arc surface 21 and a pair of brackets 28 having a horizontal hole 29 therein and projecting rearwards from the center of the concave portions 27 at a short distance. A pair of pin members 9 having a female thread tapped in the end are pivotally mounted to the end of the brackets 28 via pivot pins 10 fitted in the holes 29 of the brackets 28.

In this embodiment, the display 2 is slidably mounted to the front side of the body 1 by inserting the pin members 9 pivotally connected to the brackets 28 of the display 2 into the slots of the guide slot members 12 of the body and engaging the screws 5 with the female screws of the pin members 9 through the slide plates 3 and the springs 4 in the same manner as the first embodiment. In this case, the display 2 can be pivoted around the pivot pins 10, and thus the slant angle and height of the display can be independently adjusted at the same time. The same effects and advantages as those of the first embodiment can be, of course, obtained in the second embodiment.

Although the present invention has been described in its preferred embodiments with reference to the accompanying drawings, it is readily understood that the present invention is not restricted to the above described preferred embodiments, and various changes and modifications may be made in the present invention by those skilled in the art without departing from the spirit and scope of the present invention.

What is claimed is:

1. An electronic apparatus, comprising:
   a display unit having a display surface and a curved rear surface;
   a body unit, electrically connected to the display unit, including a front surface having a curved portion conforming to the rear surface of said display unit for slidably supporting the display unit so as to change an angle and a height of the display surface; and
   stopper means provided on the rear surface of said display unit and said curved portion of said body unit for maintaining the display surface in an arbitrary position on the curved portion.

2. The electronic apparatus according to claim 1, wherein the display unit further comprises a cover for covering a space between the rear surface of the display unit and the curved portion of the body unit.

3. The electronic apparatus according to claim 1, further including a rotation means for rotating the display unit to said arbitrary position.

4. The electronic apparatus according to claim 1, wherein the rear surface of the display unit comprises a first portion defining a first opening and the curved portion of the body unit comprises a second portion defining a second opening, said electronic apparatus further comprising a cable for electrically connecting the display unit to the body unit through the first and the second openings.

5. The electronic apparatus according to claim 4, further comprising a first sheet for covering the first opening and a second sheet for covering the second opening.

6. An electronic apparatus, comprising:
   a display unit including a display surface and a rear surface having a guide pin;
   a body unit, electrically connected to the display unit, including a front surface having a curved portion, for changing an angle and a height of the display surface, said body unit having a guide slit for guiding the guide pin; and
   stopper means provided on the rear surface of the display unit and the curved portion of the body unit for maintaining the display surface in an arbitrary position on the guide slit.

7. The electronic apparatus according to claim 6, wherein the guide pin is pivotally connected to the rear surface.

8. The electronic apparatus according to claim 6, wherein the display unit further includes a cover for covering a space between the rear surface of the display unit and the curved portion of the body unit.

9. The electronic apparatus according to claim 6, wherein the rear surface of the display unit comprises a first portion defining a first opening and the curved portion of the body unit comprises a second portion defining a second opening, said electronic apparatus further comprising a cable for electrically connecting the display unit to the base unit through the first and the second openings.

10. The electronic apparatus according to claim 7, further comprising a first sheet for covering the first opening and a second sheet for covering the second opening.

11. An electronic apparatus, comprising:
    a body unit including a front surface having a first portion defining a first opening;
    a display unit including a rear surface having a second portion defining a second opening;
    means on said front surface of said body unit for slidably supporting the display unit on the front surface;
    a first sheet covering the first opening and slidably mounted on the body unit;
    a second sheet covering the second opening and slidably mounted on the display unit; and
    a cable for electrically connecting the display unit to the body unit through the first and the second opening and the first and the second sheet.

* * * * *